July 8, 1958   R. A. WEBSTER ET AL   2,842,385
BAND CLAMP WITH SLIP-BAND CONSTRICTOR MEANS
Filed March 24, 1953   2 Sheets-Sheet 1
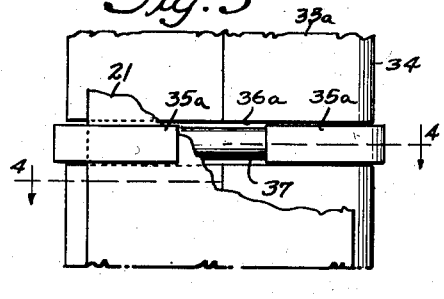
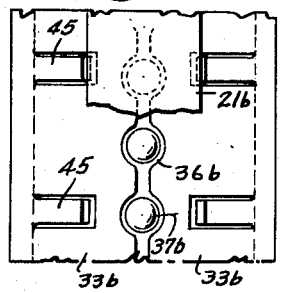
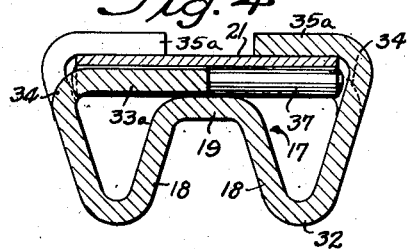
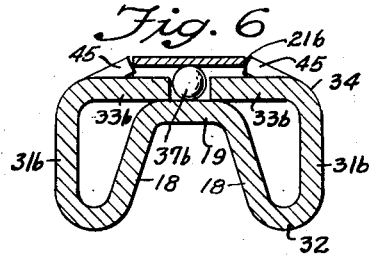
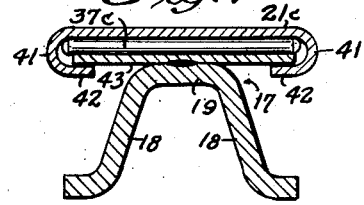
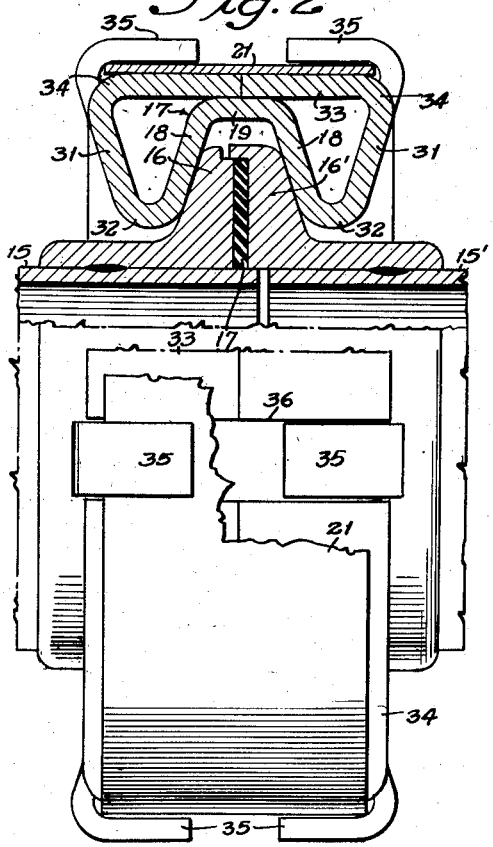
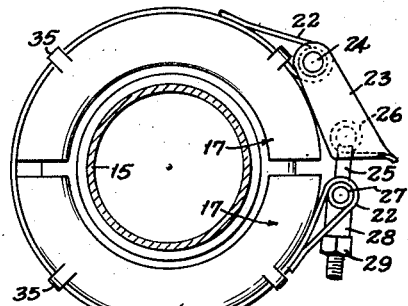
INVENTORS
A. DALE HERMAN
ROBERT A. WEBSTER
THEODORE A. WOOLSEY
BY Lynn Latta
ATTORNEY July 8, 1958  R. A. WEBSTER ET AL  2,842,385
BAND CLAMP WITH SLIP-BAND CONSTRICTOR MEANS
Filed March 24, 1953  2 Sheets-Sheet 2
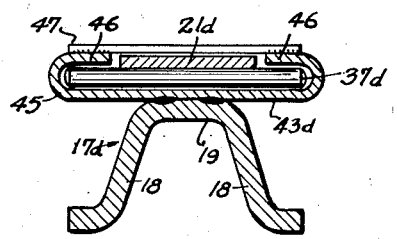
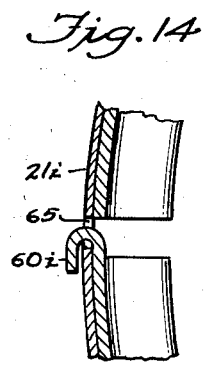
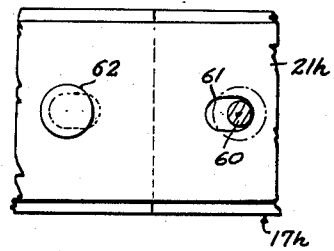
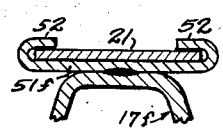
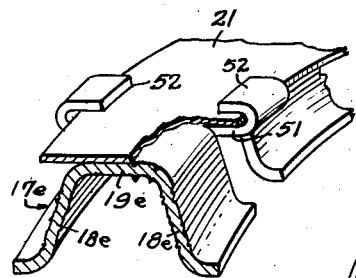
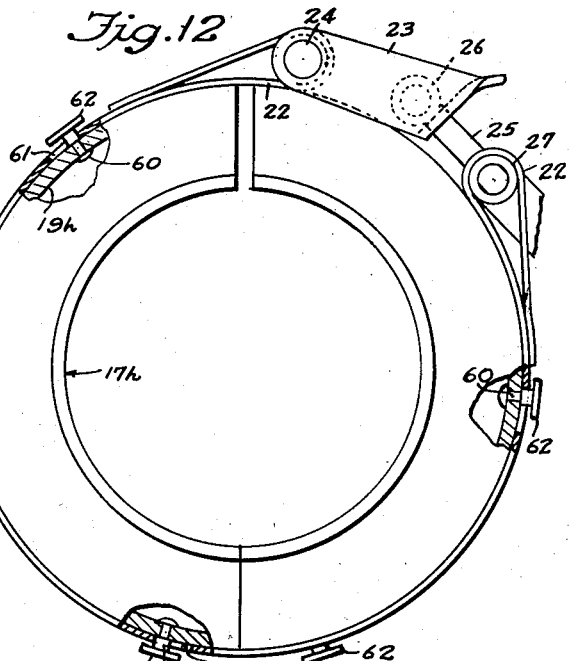
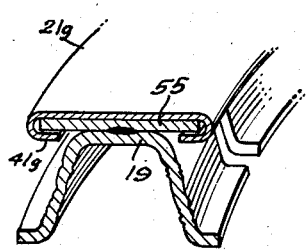
INVENTORS
A. DALE HERMAN
ROBERT A. WEBSTER
THEODORE A. WOOLSEY
BY Lynn H. Latta
ATTORNEY

United States Patent Office 2,842,385
Patented July 8, 1958

2,842,385

BAND CLAMP WITH SLIP-BAND CONSTRICTOR MEANS

Robert A. Webster, Los Angeles, Albert Dale Herman, Encino, and Theodore A. Woolsey, Pasadena, Calif., assignors, by mesne assignments, to Aeroquip Corporation, Jackson, Mich., a corporation of Michigan Application March 24, 1953, Serial No. 344,268

5 Claims. (Cl. 285—408)

This invention relates to V-band clamps of the type used in joining the flanges of aligned tube sections to provide a tubing joint. More particularly, the invention relates to V-band clamps wherein a plurality of segments of channel section material, functioning as jaws for embracing the tube flanges and drawing them together, are encircled by a continuous constrictor band which has means for applying circumferential tension thereto for constricting the jaw segments against the tube flanges.

In general, the invention contemplates such a V-band clamp embodying a floating connection between the jaw segments and the constrictor band, such that the jaw segments are free for limited relative circumferential slippage with reference to the constrictor band, whereby the jaw segments may more readily seat themselves in uniformly loaded wedging engagement with the tube flanges throughout the circumference thereof, without being required to slide circumferentially on the flanges as the constrictor band is stretched. In this connection it will be understood that in the conventional band clamp, the constrictor band will actually elongate under the fairly high tension loads that are applied to it in seating the clamp against a pair of tube flanges, and where the jaw segments are rigidly secured (as by spot welding) to the band in accordance with the present practice, the jaw segments must either slide circumferentially on the flanges in response to the stretching of the constrictor band, or the spot welded connections between the band and the segments will pull loose. Since high friction loads are developed between the jaw segments and the flanges in the final stages of tightening of the clamp, the resistance to circumferential sliding is considerable.

With the foregoing in mind, an important object of the invention is to provide a V-band clamp, avoiding the difficulties arising from stretching of the constrictor band, and avoiding the necessity for any circumferential sliding of the jaw segments on the tube flanges.

A further object of the invention is to provide a V-band clamp wherein the jaw segments are free for limited alignment adjustment with reference to the constrictor band, so that in all cases they may assume positions aligned in a common plane normal to the axis of the tube flanges to which they are applied, regardless of any misalignment of the jaw segments with reference to the constrictor band in the assembling of the clamp. The wearing that takes place on assembly jigs on which constrictor bands are spot welded to the jaw segments, may eventually result in small misalignments between the jaw segments and the band during the spot welding or other assembling operation. If a band clamp with rigidly attached jaw segments, out of alignment, is applied to the flanges of a tubing joint and constricted there-around, high secondary loads will be induced between the segments and the band, as the segments attempt to align themselves on the tube flanges, and this is likely to result in weakening the band clamp or distorting it. Accordingly, a further important object of the invention is to provide a band clamp having a floating connection between segments and band such that all such secondary loads are avoided and the jaw segments are free to accurately align themselves as they are applied to the tube flanges, regardless of their alignment with the band.

A further object of the invention is to provide, in such a V-band clamp, means for buttressing the lateral walls of the coupler segments against spreading under the pressure developed between these walls and the tubing flanges.

Other objects will become apparent in the ensuing specification and appended drawings in which:

Fig. 1 is a radial sectional view through a line of tubing with the improved band clamp applied thereto as a coupling device;

Fig. 2 is a view thereof partially in axial section and partially in side elevation;

Fig. 3 is a fragmentary plan view of a modified form of coupler segment;

Fig. 4 is an axial sectional view taken on the line 4—4 of Fig. 3;

Fig. 5 is a fragmentary plan view of a coupler segment embodying another modified form of the invention;

Fig. 6 is an axial sectional view of the coupler segment shown in Fig. 5;

Fig. 7 is an axial sectional view of a coupler segment embodying a further modification of the invention;

Fig. 8 is an axial sectional view of a coupler segment embodying a still further modification of the invention;

Fig. 9 is a sectional isometric view of a band clamp embodying another modification of the invention;

Fig. 10 is a fragmentary axial sectional view of a band clamp embodying another modified form of the invention;

Fig. 11 is a sectional isometric view of a band clamp embodying a still further modified form of the invention;

Fig. 12 is a side view of a band clamp embodying another modification of the invention, parts being broken away and shown in section;

Fig. 13 is a fragmentary plan view of the clamp of Fig. 12; and

Fig. 14 is a fragmentary radial sectional view of a band clamp embodying another form of the invention.

Referring now to the drawings in detail, we have shown in Figs. 1 and 2, as an example of one form in which the invention may be embodied, a band clamp adapted to form part of a coupling assembly for joining aligned tube sections 15, 15', the tube sections 15, 15' having secured to their adjacent ends, coupling flanges 16, 16' adapted to be brought together with a seal of some kind interposed therebetween (the plain washer gasket being shown merely by way of example).

The band clamp of our invention provides a means for coupling the flanges 16, 16', and to this end, it embodies a pair of semi-circular segments of W—V section channel material each including a central V-section, indicated generally at 17 and comprising a pair of radially inwardly diverging frusto-conical side walls or jaw members 18 joined by a peripheral web or crown portion 19. The jaws 18 function, when drawn radially inwardly, to wedge the flanges 16, 16' toward each other, the outer faces of the flanges being preferably frusto-conical to mate with the inner walls of jaws 18.

The segments 17 are encircled by a constrictor band 21 which is circumferentially continuous between end loops 22 thereof, end loops 22 being connected by a take-up connector including a quick-release latch 23 having a pivot pin 24 received in one of the loops 22, a T-bolt 25 having a T-head 26 receivable in latch 23, a T-trunnion 27 pivotally mounted in the other loop 22 and having a central leg 28 which is engaged by a nut 29 threaded onto bolt 27, for drawing the loops 22 toward each other as the nut is threaded onto the bolt.

It will be understood that the particular connector device described above does not in itself constitute a part of the present invention, and that other connector devices could as well be employed to draw the ends of the band together.

Returning now to Fig. 2, the coupler segments include lateral buttress walls 31 which are joined to the inner margins of jaws 18 through return bends 32 and which may diverge radially outwardly to the periphery of the assembly, where they are bent inwardly, at 34, to provide peripheral flanges 33 lying against the crown portion 19 of the V-channel 17.

The peripheral flanges 33 are preferably arranged with their edges in abutting engagement as shown in Fig. 2, for mutual support. The cylindrical outer faces of flanges 33 provide a bearing surface against which constrictor band 21 bears with a sliding contact. It will now be apparent that constriction of band 21 will result in pressure being applied thereby in a radially inward direction to flanges 33 and through flanges 33 to the crown portion 19 and the buttress walls 31, thereby applying inward pressure to the V-channel sections 17, with the buttress walls 31 bracing the inner margins of the jaws 18 against spreading as wedging pressure is applied to the flanges 16, 16'.

In V-band clamps heretofore employed for tube coupling purposes, it has been practically the universal practice to attach the constrictor band, as by riveting or welding, to the crowns of the V-channel segments, and as the constrictor band is taken up circumferentially, there is always some circumferential sliding adjustment of the jaws of the V-segments against the tube flanges, required by the fixed connections between the constrictor band and the V-segments.

The present invention provides for circumferential slippage of the constrictor band 21 with reference to the V-segments in order that the V-segments may remain in circumferentially fixed engagement with the tube flanges where they first engage the same, the slippage allowing the band to be taken up circumferentially without requiring any circumferential movement of the V-segments. This results in a much more uniform distribution of wedging engagement with the tube flanges throughout the circumferential extent of the V-segments, and of course eliminates the problem of the constrictor band pulling loose from the V-segments at the rivets or spot welds which connect it to the V-segments in the prior band of this general class. The ultimate result is a V-band which operates much more satisfactorily and is much more permanent and durable.

It is preferable to actually attach the V-segments to the constrictor band, while allowing the circumferential slippage. To this end, the invention, in the form thereof shown in Fig. 2, provides a series of circumferentially spaced tabs 35, upstruck from the flanges 33 and the bend portions 32 of the segments. In order to form the tabs 35, slots 36 are lanced in the segments.

The tabs 35 are spaced from the outer bearing surface of flanges 33 sufficiently to provide for loose embracement of the constrictor band 21 between the flanges 33 and tabs 35 as indicated in Fig. 2. At the same time, they are associated with the band 21 sufficiently closely to retain the V-segments in the desired circumferentially spaced relation in the entire assembly.

Fig. 3 illustrates the form of the invention in which additional freedom of circumferential slippage is provided for by inserting, in each of the slots 36a formed by lancing out the tabs 35a, a series of rollers or needle bearings 37 which have a diameter somewhat greater than the thickness of the flanges 33, whereby the constrictor band 21, instead of sliding against the outer faces of flanges 33, rolls upon the bearing rollers 37, the latter in turn rolling upon the crown portion 19 of the V-channel portion 17 of the segments.

It may be noted that the flanges 33 function as bearing retainers to maintain the roller bearings 37 in positions parallel to the axis of the V-band, preventing canting thereof and also maintaining the rollers in a predetermined circumferentially spaced relation. While only one of the rollers is shown in Figs. 3 and 4, it will be understood that they may be arranged in sufficiently close spacing, circumferentially, to carry the entire load of the band 21 as it is constricted, and maintain it out of contact with flanges 33.

Figs. 5 and 6 show a further modification of the invention in which, instead of roller bearings or needle bearings, there is provided a series of bearing balls 37b which are retained in notched recesses 36b in peripheral flanges 33b. The constrictor band 21b is relatively narrow in this case, the sole bearing area thereof being the central part. The flanges 33b, as in the previously described form of the invention, act as bearing retainers or cage elements, maintaining the bearing balls 37b in proper circumferential relation and restraining them against displacement axially of the coupling. Tabs 45 serve to hold the constrictor band 21b in place. Fig. 6 also illustrates how the buttress walls 31b in some cases may be disposed in planes normal to the coupling axis. Other features of the V-band of Figs. 5 and 6 may be the same as in the previously described forms of the invention.

Fig. 7 illustrates a further modification of the invention wherein the constrictor band 21c has side portions folded inwardly to provide retainer channels 41 terminating in axially inwardly projecting flanges 42. Secured to the crown portion 19 of V-channel sections 17 are semi-cylindrical runner plates 43 the marginal portions of which are embraced within channels 41 and bear against flanges 42. Interposed between runner plates 43 and continuous constrictor band 21c are a series of needle bearings 37c. The needle bearings 37c are retained by channels 41 against displacement axially of the coupling, and are sufficiently closely spaced circumferentially to avoid canting displacement.

Fig. 8 illustrates another form of the invention, in which a retainer plate 43d is attached (e. g., by spot welding) to the crown portion 19 of each V-segment 17d, retainer plates 43d being circumferentially co-extensive with segments 17d. Retainer plates 43d are provided with marginal channels 45 terminating in axially inwardly projecting flanges 46, the channels 45 functioning as retainers for a series of needle bearings 37d, with the ends of the needle bearings 37d received in channels 45.

A constrictor band 21d bears against both portions of needle bearing 37d which are exposed between the edges of flanges 46. Band 21d is preferably of a width just slightly less than the width of space between flanges 46, so as to be thereby positioned against axial displacement. Band 21d may be loosely attached to the runner plates 43d by means of short bars or strips 47 welded to flanges 46 and bridging between them, across band 21d.

Fig. 9 illustrates another modification of the invention wherein V-channel segments 17e are provided with integral upstruck tabs 51 the outer ends of which are return bent to provide retainer fingers 52 engaging above the marginal portions of constrictor band 21. The jaw members 18e are in this instance in the form of a series of circumferentially separated fingers. The band 21 has sliding bearing engagement against the crown portions 19e of the V-segments, said crown portions being in the form of webs which are continuous throughout the substantially 180° extent of the respective V-segments.

Fig. 10 shows a V-band clamp quite similar to that of Fig. 9, the difference being that the fingers 52 are return bent from the respective ends of bars 51f which are secured, as by spot welding, to the crown portions of respective jaw segments 17f.

Fig. 11 illustrates a further modification of the invention wherein semi-cylindrical runner plates 55 are attached, as by spot welding, to the crown portions 19 of respective V-band segments 17g (two are shown in Fig.

11), and wherein the constrictor band 21g has the marginal portions thereof return bent to form channels 41g in which the marginal portions of runner plates 55 are slidably received. The constrictor band 21g is of course circumferentially continuous around the entire band clamp, except for the gap therein which is bridged by a connector element.

Figs. 12 and 13 show a form of the invention wherein constrictor band 21h is loosely attached to jaw segments 17h, by rivets 60 anchored in jaw segment crowns 19h extending through slots 61 in band 21h and having respective heads 62 retaining the band to segment 17h. Slots 61 are elongated circumferentially to allow circumferential slippage of segments 17h relative to the band, and are wider than rivets 60 in a direction parallel to the clamp axis, whereby to provide for self-alignment of the jaw segments on a pair of tube flanges (assumption of positions in a common plane normal to the tubing axis) as they are tightened there-around.

The clamp of Figs. 12 and 13 embodies the further feature of having the jaw segments arranged with their ends remote from latch 23 etc., adapted to make abutting interengagement so as to establish for the rivets, in the untensioned clamp, positions adjacent those ends of the slots which are remote from such abutting ends, thereby making the full lengths of the slots available for circumferential take-up as the band is tensioned and stretched.

Fig. 14 shows another modified form of the invention wherein tabs 60i, bent from the ends of the segment webs, are inserted through slots 65 in band 21i, with the same circumferential take-up and lateral play (for self alignment as described above) being provided for by the looseness of fit of tabs 60i in slots 65.

In the form of the invention shown in Figs. 2, 4, 7, 8, 9 and 10, the constrictor band is free for unlimited circumferential slippage relative to the jaw segments, and has sufficient clearance between its edges and tabs 35, 35a or 52, or channels 41 or 41g or flanges 46, as the case may be, to provide the self alignment feature above described.

We claim:

1. In a band clamp for clamping together a pair of flanges on the ends of aligned tubes: a constrictor band having jaw segments each including a central portion of truncated V-section having a crown portion at its periphery, buttress walls extending generally radially outwardly from the inner extremities of said V-section central portion, and peripheral flanges extending toward one another from the outer extremities of said buttress walls and overlapping and lying against said crown; and tabs struck outwardly from said peripheral flanges and extending toward one another in outwardly-spaced relation to said crown to provide therewith slide-ways in which the margins of said band are slidably received and retained to provide a floating connection between said band and jaw segments.

2. A band-clamp as defined in claim 1, wherein said band bears directly upon said peripheral flanges with a sliding engagement.

3. A band clamp as defined in claim 1, including bearing rollers interposed between said crown and band.

4. A band clamp as defined in claim 1, including bearing rollers interposed between said crown and band; said flanges having pairs of opposed slots from which said tabs are struck, the ends of respective rollers being retained in the slots of respective pairs.

5. A band clamp as defined in claim 1, including bearing balls interposed between said crown and band, said flanges having notches in paired opposition, providing recesses in which said balls are retained.

References Cited in the file of this patent

UNITED STATES PATENTS

| | | |
|---|---|---|
| 2,184,855 | Stieber | Dec. 26, 1939 |
| 2,403,449 | Meyer | July 9, 1946 |
| 2,424,436 | Crater | July 22, 1947 |
| 2,548,249 | Woolsey | Apr. 10, 1951 |
| 2,602,678 | Mahoff | July 8, 1952 |
| 2,640,717 | Schneuring | June 2, 1953 |

FOREIGN PATENTS

| | | |
|---|---|---|
| 126,655 | Great Britain | May 22, 1919 |
| 722,912 | France | Jan. 8, 1932 |
| 851,292 | Germany | Oct. 2, 1952 |